United States Patent [19]

Holmes et al.

[11] Patent Number: 4,800,940
[45] Date of Patent: Jan. 31, 1989

[54] VEHICLE WHEELS

[75] Inventors: Thomas Holmes; Phillip N. Griffiths, both of Sutton Coldfield, England

[73] Assignee: S P Tyres U K Limited, Birmingham, England

[21] Appl. No.: 74,673

[22] Filed: Jul. 17, 1987

[30] Foreign Application Priority Data

Jul. 19, 1986 [GB] United Kingdom ............... 8617729

[51] Int. Cl.⁴ .................. B60C 5/16; B60C 15/02; B60B 21/10
[52] U.S. Cl. .............................. 152/379.4; 152/381.4
[58] Field of Search ............ 152/379.42, 379.3, 379.5, 152/381.3, 381.4, 384, 375,

[56] References Cited

U.S. PATENT DOCUMENTS 4,351,382 9/1982 Corner et al. ................ 152/379.4

FOREIGN PATENT DOCUMENTS 0170085 3/1985 European Pat. Off. ......... 152/381.4

Primary Examiner—James B. Marbert
Attorney, Agent, or Firm—Birch, Stewart, Kolasch & Birch

[57] ABSTRACT

A vehicle wheel rim is disclosed a pair of bead seats, and axially inwards of and adjacent to each bead seat a circumferentially extending tire toe engaging groove. There is a secondary bead retaining means between the bead seat and the groove comprising a hump having a height measured radially from the bead seat surface adjacent to the hump of 1 to 3.0 mm. The hump preferably has a steep surface on its axially outer edge. The resultant wheel still correctly seats a normal tire with the toe engaging the hump when the tire is deflated and correctly engages in a TD type of tire with the toe in the groove.

11 Claims, 1 Drawing Sheet

VEHICLE WHEELS

This invention relates to vehicle wheels, and in particularly, to wheel rims of the type described in U.K. Patent Specification No. 1 584 554 which provides a wheel rim having adjacent to and axially inwards of each bead seat a circumferentially extending, continuous groove. The groove is designed to accommodate a special toe on the tire for which the wheel rim is designed and together they provide an assembly with a very high degree of bead retention and resultant vehicle safety even in the event of a tire deflation. Such tires and wheel rims are available in some countries with the designation "TD" on the rim and tire.

A problem with this type of wheel is that if a normal tire without the "TD" toe but of the same nominal bead seating diameter is fitted to the rim, while full "inflation" is readily achieved, improper air retention occurs in some service conditions. In particular, when cornering with the tire only slightly deflated, the bead can rock on its seat into the groove and allow further air loss. This has resulted in tires and wheels of the "TD" type being limited to non-standard bead seat diameters to avoid dangerous mismatching.

The present invention overcomes the above problem with such wheels and provides a wheel rim suitable for use with a tire having a bead retaining toe as well as with normal tires.

According to one aspect of the present invention a wheel rim is provided comprising a pair of spaced apart bead seats and axially inwards of each bead seat and adjacent thereto a circumferentially extending tire toe engaging groove characterized by a secondary bead retaining means between the bead seat and the groove comprising a hump having a height in the radial direction of between 1.0 and 3.0 mm. The hump is preferably less than 3 mm in width.

Preferably the edge of the hump on the outside, axially of the wheel, has a face which is substantially perpendicular to the bead seat to present a toe engaging face to the tire of a standard tire. By substantially vertical is meant at 80 degrees or more to the axial centerline of the wheel rim.

The hump may be cast integrally with a cast wheel rim, but for a rolled wheelrim the hump may be attached to the rim after rim manufacture. Such attachments may be by welding etc.

The hump may be a rectangular section or a round or circular section member. Preferably it comprises a circumferentially continuous hump although it may be formed by several short components positioned end to end or spaced apart around the wheel rim.

The hump may be adjacent to the groove or may be on the edge or shoulder part of the groove.

Further aspects of the present invention will be apparent from the following description, by way of example only of one embodiment in conjunction with the attached drawings wherein.

Figure 1:
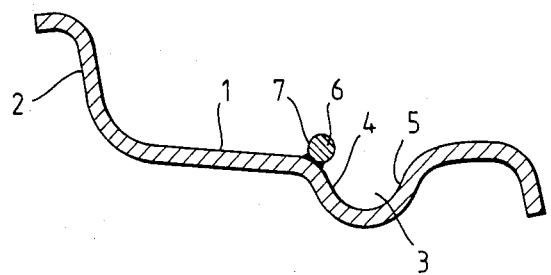
FIG. 1 is a cross section of one bead seat of a wheel rim.

The wheel shown in FIG. 1. comprises a tapered bead seat 1 having a tire retaining flange 2 axially outwards of the bead seat 1. A tire bead receiving groove 3 is positioned adjacent to the bead seat 1 and this groove is of the "TD" type as described in U.K. Patent Specification No. 1 584 554. The groove 3 has smoothly curved axially outer and axially inner groove sides 4, 5 which are radiused such that the wheel rim may be made by conventional rolling techniques.

A steel ring 6 is welded to the upper edge of the axially outer groove side 4 as shown. The ring 6 has a circular cross-section and projects in the radial direction 2 above the bead seat surface adjacent to the ring 6. The ring 6 therefore provides a low hump with a steep surface 7 on the axially outer side.

Figure 2:
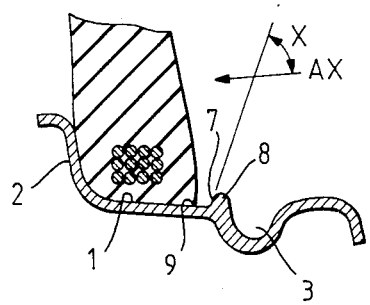
FIG. 2 is a cross section of one alternative wheel rim shape with a standard tire.

The wheel rim shown in FIG. 2. is a cast wheel rim having a narrow hump 8 cast integrally with the wheel rim and having a steep surface 7 at an angle greater than 80 degrees to the axial direction of the wheel rim AX.

The ring 6 or hump 8 may have a cross section other than those shown including rectangular cross sections so long as the step surface 7 is provided as it is important to retain standard tire that this surface is at 80° or more.

The height of the ring may be from 1.0-3 mm for car wheel rims and higher with larger diameter rims. However, the height must not be enough to prevent satisfactory fitting of the bead to its seat or to stretch or damage the bead reinforcement.

Figure 3:
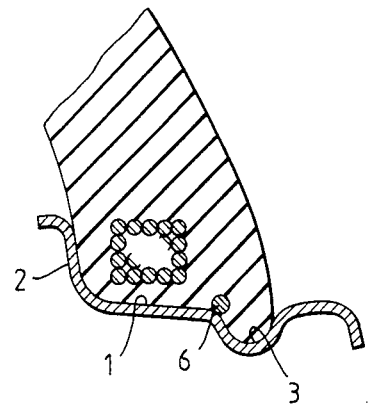
FIG. 3 is a cross section of the wheel rim of FIG. 1. with a TD tire bead fitted.

In use on a vehicle the wheel rim may carry a TD type tire as shown in FIG. 3 in which case the hump 6,8 has no effect on the bead retention properties which are, however, maintained as those now well known with TD tires and wheels. If desired the "TD tire may be modified by providing a small groove or notch to fit over the ring or hump 6, 8 and still further improve the fit of the tire to its rim. The bead toe engaged in the groove generates bead retention forces when the bead is rotated quite unhindered by the hump 6, 8.

The wheel rim, however, when fitted with a standard tire as shown in FIG. 2 provides an assembly where the conventional bead is given conventional bead retaining properties. In this case the steep surface 7 is engaged by the toe 9 of the tire. The steepness of the hump 6, 8 provides bead retention to a similar degree as that with a conventional flat ledge wheel rim or indeed a conventional wheel rim with hump.

Thus the resultant wheel rim may be used either with TD tires or conventional tires thus overcoming one of the problems with present TD wheels to which conventional tires may not be safely fitted.

Having now described my invention what I claim is:

1. A vehicle wheel rim, comprising:
   a pair of spaced apart circumferentially extending bead seats for retaining a bead of a tire to be placed on said rim;
   a circumferentially extending tire toe engaging groove located axially inward of wach of said pair of bead seats; and
   a hump, located between each bead seat and tire toe engaging groove, wherein said hump has a height, measured radially from said bead seat surface adjacent to said hump, of 1.0 to 3.0 mm.

2. A wheel rim according to claim 1, wherein said hump has a width in the axial direction of of not more than 3 mm.

3. A wheel rim according to claim 2, wherein said hump provides on its axially outer edge a tire contacting face which is sufficiently steep in relation to said bead seat to engage a toe of a conventional tire fitted to said wheel rim when said tire toe is moved inwardly, so that said hump functions to retain a bead of said tire.

4. A wheel rim according to claim 3, wherein said hump provides on its axially outer edge a tire contacting face which is at an angle of 80 degrees or more to the axial direction of said wheel rim.

5. A wheel rim according to claim 3, wherein said hump comprises a circular cross section member.

6. A wheel rim according to claim 1, wherein said hump is positioned on a shoulder of the axially outer side of said groove.

7. A wheel rim according to claim 1, wherein said hump is attached to said wheel rim subsequent to wheel rim manufacture.

8. A wheel rim according to claim 7, wherein said hump is welded to said wheel rim.

9. A wheel rim according to claim 1, wherein said hump is circumferentially continuous.

10. A wheel rim according to claim 1, wherein said groove has curved axially outer and axially inner groove sides.

11. A wheel rim according to claim 1, wherein said tire is a TD type tire.

* * * * *